Patented Aug. 9, 1949

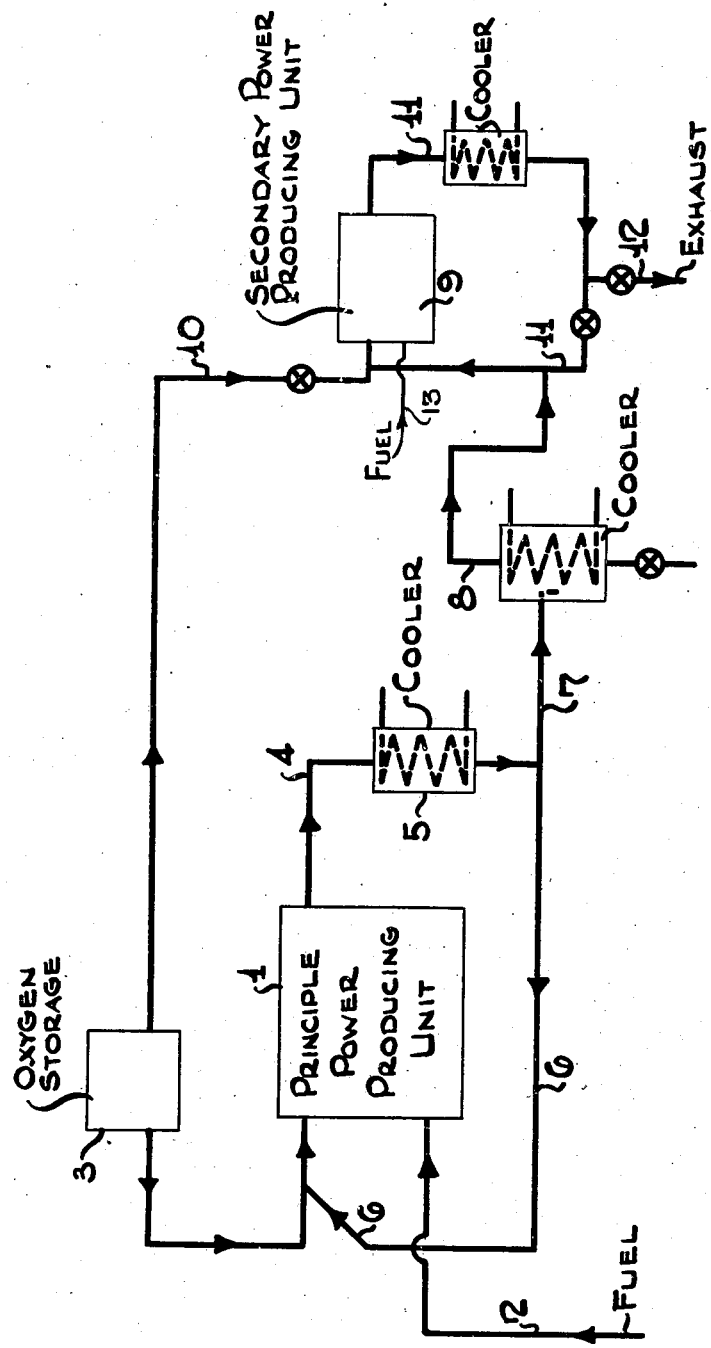

2,478,682

UNITED STATES PATENT OFFICE 2,478,682

METHOD FOR GENERATING POWER

Albert J. Blackwood, Westfield, N. J., assignor to Standard Oil Development Company, a corporation of Delaware Application December 20, 1944, Serial No. 569,063

6 Claims. (Cl. 60—44)

The present invention relates to a method for generating mechanical power and more specifically to the use of internal combustion engines for the generation of power and to an advantageous arrangement for the operation of such engines. The invention will be fully understood from the following description.

The drawing is a diagrammatic plan showing the arrangement of a large engine with a smaller engine operating on the exhaust gas from the former, according to the present invention.

Heretofore internal combustion engines have in general been operated exclusively on mixtures of fuel plus natural air but there are cases in which it is desirable to enrich the air in respect to oxygen content above the 21% in natural air or even to employ pure oxygen. Under these conditions the efficiency in respect to the oxygen is even more important than the fuel efficiency and every means must be adopted to reduce the waste of the expensive oxygen.

It has been found that a large internal combustion engine when operating at the most efficient load and with good fuel economy exhausts a gas containing from 3 to 10% of the oxygen. With enriched air of above 50% $O_2$, the most effective operation resulted when exhaust gas containing more than the 3 to 10% as given above was produced, and it has been found possible, by adding the necessary fuel, to operate a smaller internal combustion engine on this oxygen containing exhaust gas, obtaining a valuable increase in power and a substantial reduction in the total oxygen lost with the exhaust gases. In this manner, that is, by operating two engines in this way, it has been found possible to obtain a high fuel efficiency and at the same time to obtain a high efficiency in respect to oxygen utilization.

Referring to the drawing, numeral 1 denotes a large internal combustion engine which may be considered as the principal power generating unit. This engine may be of any particular type, whether operating on Diesel, Otto, or operating on modifications of these cycles. This engine is fed with liquid fuel from pipe 2 and oxygen from storage tanks 3. The engine exhausts in the usual manner through a pipe 4 and a large volume of the exhaust gas is cooled at 5 and recirculated by pipe 6 so as to mix with the oxygen supplied from the storage tanks 2 before entering the engine. In this manner the combustion temperature, which of course is related to the oxygen content of the combustion supporting gas, is maintained sufficiently low so as to prevent damage to the engine. The oxygen content of gas mixtures, not including the fuel itself should be not much higher than 50% and is preferably between 20 and 50%.

The exhaust gas from the engine 1 may contain from 5 to about 25% of the oxygen supplied, and this is passed through pipe 7 to cooler 8 from which condensed water is removed and residual gas passes to a smaller or secondary engine 9. Additional oxygen may be added by pipe 10 and the exhaust gas from this engine may in part be recirculated to the intake of engine 9 by pipe 11 just as in the case with the larger engine 1 and for the same reason. The remainder of the exhaust gas is discarded through pipe 12. The oxygen content of this secondary exhaust gas is maintained at as low a figure as is conveniently possible; for example, it may be as low as 2% and should in all cases be below 5%. Additional fuel is added to the secondary engine by means of the pipe 13.

In the operation of the present system, it will be noted that there are two power producing units and the first much larger than the second, preferably from 3 to 15 times the size of the second. Most of the power is thus generated in the first unit and this is operated under the known conditions for the greatest fuel efficiency, that is to say so as to produce power with the least waste of fuel. Thus, 40% to 35% of the available heat is converted to power, depending on the size and design of engine. Such an operation can be effected according to known means and at the load which is as near as possible to the designed load of the engine and with reasonable excess of oxygen. With such an operation, the exhaust gas contains free oxygen in the range from 5 to 20% of that supplied to the engine, depending on the amount of oxygen in the combustion supporting gas. The secondary or smaller engine is employed to utilize this exhaust oxygen and to burn extra fuel with it under such conditions as are adapted to effect a clean-up of the oxygen. Even though these conditions in the secondary engine may not lead to the greatest possible fuel efficiency, nevertheless the over-all efficiency of the combination of power producing units is found to be high not only with respect to the utilization of the fuel but also for the expensive oxygen.

In each case it is desirable to recirculate a portion of the exhaust gas from the unit in which it is produced and this is adjusted during the runs but the volume of recycle primarily depends on the oxygen content of the oxygen source and practical combustion temperatures. With pure oxygen and the engines of the present day design which are adapted to the use of atmospheric air, it is desirable to recirculate from 80 to 90% of the gas exhausted from the primary or larger engine and to operate this engine smoothly and with the least variation. Under these conditions, the exhaust gas, as stated above, will contain more oxygen than one can afford to waste and should be at least 5% of the supplied amount. The oxygen content of this exhaust gas may vary from time to time and enough additional oxygen is added to the secondary engine to keep its proportion such as to support combustion when additional fuel is supplied. The amount of gas recirculated in the smaller engine will thus be varied from time to time so that the first unit is run as steadily as possible and the operating conditions in the second unit are regulated or adjusted continually to adapt its operation to the quality of the exhaust gas fed to it, from the first. Ordinarily the amount of gas recirculated in the second unit is two to three times the amount of exhaust gas fed to it from the first unit. At times the oxygen content of the exhaust gas from the first unit is sufficient to operate the second unit, that is to say without any additional oxygen supplied directly to the second unit, but it is generally found better to feed some oxygen directly to the second unit and to adjust this with the quality and the volume of the exhaust gas. In this manner a close control of the operation is effected. The second unit, it will be understood, operates as a sort of clean-up to insure an effective oxygen utilization. The oxygen content of the exhaust gas from the second unit may be reduced continuously as low as ½ to 4% of the total fed to the combined engines.

As an example of the type of operation shown above, the primary operating unit was a two cycle General Motors Diesel engine having a 20 H. P. rating and the secondary engine was a C. F. R. Diesel, 4 cycle type, having a 5 H. P. rating. The first engine was fed with 7.38 pounds of fuel per hour and 6.06 cubic feet of pure oxygen per minute. 98.3 cubic feet per minute of its exhaust gas was continuously recycled so that the gas fed to the engine (exclusive of the fuel) had the following analysis:

|            | Gas to First Exhaust Engine (Ex. fuel) | Feed Unit Exhaust Gas |
|------------|-----------------------------------------|-----------------------|
| $CO_2$     | 37.2                                    | 39.5                  |
| $O_2$      | 22.3                                    | 17.3                  |
| $CO$       | .1                                      | .1                    |
| $N_2$      | .9                                      | 1.1                   |
| $H_2O$     | 39.5                                    | 42.0                  |

A portion of exhaust gas from this first unit was fed to the second unit and amounted to 4.2 cubic feet per minute, since .1 lb./min. of water was removed by condensation. To this was added .95 cubic feet of pure oxygen and 4.5 cu. ft. of exhaust gas from the secondary unit was recycled per minute. The fuel fed directly to the second unit amounted to 2.19 pounds per hour. The compositions of the gases were as follows:

|        | First Engine Exhaust after Removal of .1 Lbs. Water | Gas Fed to Second Engine | Second Engine Exhaust |
|--------|------------------------------------------------------|--------------------------|-----------------------|
| $CO_2$ | 57.9                                                 | 60.3                     | 75.6                  |
| $O_2$  | 25.3                                                 | 24.4                     | 7.4                   |
| $CO$   | .2                                                   | .2                       | .2                    |
| $N_2$  | 1.5                                                  | 1.3                      | 1.4                   |
| $H_2O$ | 15.0                                                 | 13.8                     | 15.4                  |

The power balance in this arrangement was as follows:

|                    | 1st Engine | 2nd Engine | Over-all |
|--------------------|------------|------------|----------|
| B. H. P            | 13.92      | 2.64       | 16.56    |
| I. H. P            | 22.02      | 4.62       | 26.64    |
| #Fuel/I. H. P./Hr  | .335       | .474       | .359     |
| #$O_2$/I. H. P./Hr | 1.34       | 1.01       | 1.28     |
| $O_2$/Hr per cent  | [1] 14.7   | 4.1        | 4.1      |

[1] As feed.

The over-all loss of oxygen amounted to 4.1%.

I claim:

1. An improved method for generating mechanical power from internal combustion engines which comprises feeding a primary power producing unit with fuel and with an excess of a combustion supporting gas richer in oxygen than air, adjusting conditions of operation to obtain high efficiency in respect to fuel whereby the exhaust gas contains a substantial portion of free oxygen, then passing the exhaust gas to a smaller secondary power producing unit with additional fuel and operating the same to consume a substantial proportion of the oxygen in the exhaust gas from the primary unit.

2. Process according to claim 1 in which a portion of the exhaust gas from the first power producing unit is cooled and recycled to the intake of such unit.

3. Process according to claim 1 in which portions of the exhaust gases from each of the power producing units are recirculated to the power producing units in which they were generated.

4. Process according to claim 1 in which the initial power producing unit is 3 to 15 times the size of the second.

5. Process according to claim 1 in which the primary power producing unit is operated for high fuel efficiency whereby the exhaust gas contains more than 10% of the oxygen supplied to the engine, and the second engine is operated on this exhaust gas with an adjusted proportion of fuel adapted to clean up the oxygen.

6. Process according to claim 1 in which the first unit is operated to give high fuel efficiency and an exhaust gas containing above 10% oxygen, and the second power producing unit is operated on the exhaust gas with a proportioned amount of additional fuel to produce an exhaust gas containing less than 5% oxygen.

ALBERT J. BLACKWOOD.

REFERENCES CITED

The following references are of record in the file of this patent:

UNITED STATES PATENTS

| Number    | Name    | Date          |
|-----------|---------|---------------|
| 2,225,311 | Lysholm | Dec. 17, 1940 |
| 2,303,381 | New     | Dec. 1, 1942  |